APPARATUS FOR MOUNTING WASHERS ON COMPONENT LEADS

Filed Oct. 17, 1963 2 Sheets-Sheet 1

INVENTORS
J. C. DUCHARME
W. T. NOWELL
BY W. Johnson
ATTORNEY

Oct. 5, 1965 J. C. DUCHARME ETAL 3,209,441

APPARATUS FOR MOUNTING WASHERS ON COMPONENT LEADS

Filed Oct. 17, 1963 2 Sheets-Sheet 2

United States Patent Office 3,209,441

Patented Oct. 5, 1965

3,209,441
APPARATUS FOR MOUNTING WASHERS ON COMPONENT LEADS

Joseph C. Ducharme, Haverhill, and Winford T. Nowell, Groveland, Mass., assignors to Western Electric Company, Incorporated, New York, N.Y., a corporation of New York Filed Oct. 17, 1963, Ser. No. 316,802
10 Claims. (Cl. 29—203)

This invention relates to apparatus used in the fabrication of electrical components, and more particularly to the mounting of washers on the leads of double axial lead coil wound resistors.

In the manufacture of certain types of resistors, wire is wound on forms which are made of dielectric material and have axially aligned leads extending from the ends thereof. To complete the component and to provide means for securing the ends of the wire to the leads, solder rings are formed on the leads as disclosed in copending application W. T. Nowell–E. E. Simpson, Serial No. 299,767, filed August 5, 1963. The solder, in each instance, is utilized in securing a washer of conductive material to the lead adjacent each end of the dielectric member.

An object of the invention is to provide an apparatus which is highly efficient in the mounting of washers on component leads.

In accordance with the object, the invention comprises means for moving partially assembled components relative to one mounting station where a lead of the component is disposed in a mounting position, means for centrally aligning a washer with the mounting position, and means for placing the washer onto the end of the lead.

Additional features include means to force the washer and a solder ring, disposed on the lead, closely adjacent each end of the dielectric member and additional means to heat the washer to melt the solder and complete the connection of the washer and the lead.

Other objects and advantages will be apparent from the following detailed description when considered in conjunction with the accompanying drawings wherein.

Figures 1, 2:
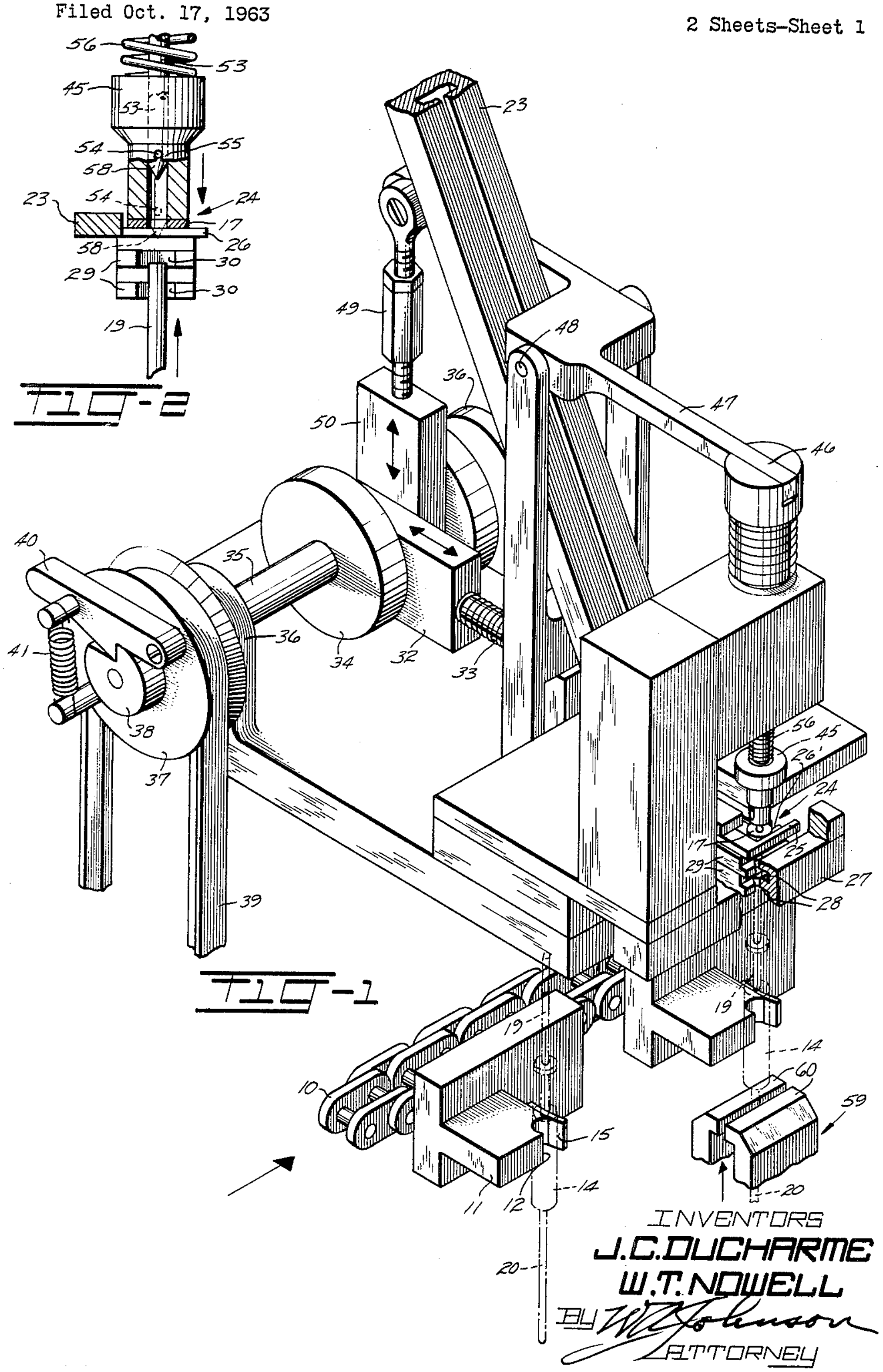
FIG. 1 is an isometric view of certain features of the apparatus.
FIG. 2 is a fragmentary vertical sectional view of a portion of the apparatus about the washer receiving station.
Figure 3:
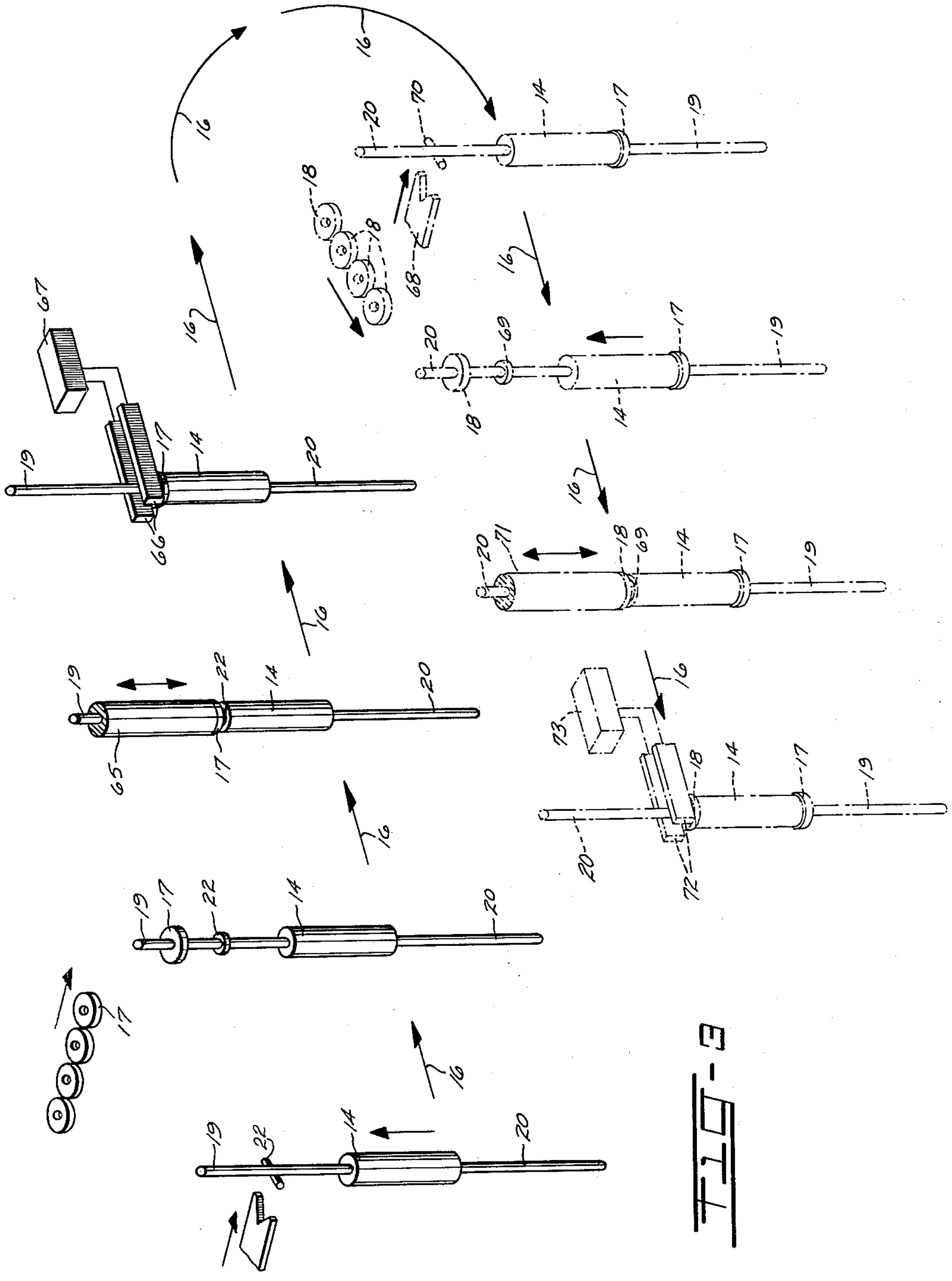
FIG. 3 is a schematic illustration of the apparatus extending through forward and reverse paths where washers are mounted first on one lead of a component member and then on the other lead.

The apparatus is composed of an endless chain-type conveyor 10 having holders 11 mounted thereon at spaced positions with pockets 12 to receive component members 14. Resilient members 15 tend to hold the component members in the pockets, but permit longitudinal movement of the members therein. In FIG. 3, the series of arrows 16 represent the upper forward and lower reverse paths of the conveyor 10 and the holders 11. This figure shows a plurality of upper and lower stations, actually four upper and four lower stations where operations are performed in the mounting of washers 17 and 18 on leads 19 and 20 of the component members 14. At the first forward station, illustrated in FIG. 3, a ring of solder 22 is formed about the lead 19 and this lead is about to receive a washer 17 at the second station. The specific structure for accomplishing this result is shown in FIGS. 1 and 2.

The washers 17 are fed into a chute 23 by the aid of a vibrating feeder (not shown) which keeps the chute filled with washers. This is to insure that after each operating cycle of this portion of the machine, there always will be a washer in the work station indicated generally at 24. At this station, a stop 25 assists in positioning the washer 17 on a shelf 26 of the chute which is open at the side 26'. A member 27, having stationary parallel jaws 28, serves in cooperation with spaced movable jaws 29 having V-shaped notches 30 in the faces thereof to engage the component lead 19 to locate it in the mounting position. The movable jaws 29 are supported for sliding movement in a guideway (not shown) and are responsive to a cam follower 32 and an intermediate cushioning spring 33. The cam follower 32 is responsive to its cam 34, which is mounted on a cam shaft 35. The cam shaft 35 is supported in suitable bearings 36 and is operatively connected to a drive pulley 37 through an overload clutch 38. The pulley 37 is driven continuously from a power source (not shown) through a belt 39. The clutch 38 may be of any conventional type having, as illustrated, a latch 40 normally holding the clutch connected through the aid of a spring 41 and adapted to be released by an overload or jam in the driven mechanism.

A unit 45 is operatively connected at 46 to one end of a lever 47 which is pivotally mounted at 48, the other end of the lever being adjustably connected at 49 to a cam follower 50. The cam follower 50 is responsive to its cam 51 to cause rocking movement of the lever 47 and movement of the unit 45 through an operating cycle. Normally, the unit 45 is positioned above the mounting area to allow the component member, which has just received a washer, to move its lead through the opening 26' out of the area and a new washer moved into position on the shelf 26 to be mounted on the next lead. When the new component member and washer are in position and the jaws 28 and 29 close on the lead, the unit 45 is moved downwardly starting its operating cycle. It will be noticed in FIG. 2 that the unit 45 is actually supported and disposed concentric with a centering pin 53, which carries a pin 54 extending laterally through the centering pin and positioned to ride in elongated slots 55 of the unit 45. A spring 56 assures movement of the unit 45 in advance of the centering pin 53 so that it will come to rest on the washer 17 held by the shelf 26 of the chute 23. However, before the lead 19 is moved upwardly, continued action of the lever 47 causes the centering pin with its pointed or conical end 58 to move into the aperture of the washer, thus truly centering the washer aperture with the center of the lead 19. When these actions have been completed, a pusher indicated generally at 59, with members 60 spaced to receive the lead 20, is moved upwardly by suitable means (not shown) to engage the lower end of the component member 14 and force it upwardly until the lead 19 enters the unit 45. In actual practice, the movable jaw 29, and its association with the stationary jaws 28, assures positioning of the lead 19, but does not clamp it to resist longitudinal movement of the lead into the washer. Furthermore, the cam 51 operates to withdraw the centering pin 53 in advance of the vertical movement of the lead 19, the spring 56 continuing to hold the washer in its adjusted position and to assure mounting of the washer on the end of the lead.

Referring again to FIG. 3, an additional means, such as a sleeve 65 at another station is moved downwardly to force the washer and the solder ring 22 in close engagement with the adjacent end of the component member 14. At another station, heating elements 66, energized through suitable means 67, heat the washer under suitable pressure to secure the washer to the end of the component member and to the lead 19.

After the conveyor has completed its movement in the upper forward path, the conveyor moves about a sprocket (not shown) to move the holders 11 with the components into the lower reverse path inverting the component members so that the leads 20 are uppermost. A continuation of the structures shown along the forward path will complete mounting of the washers 18 on the leads 20 as the component members 14 in their inverted positions move in the lower path. At the lower right of FIG. 3, means 68 is shown for forming a ring 69 of a solder wire 70 about the lead 20. At the next station, a structure identical with that shown in FIGS. 1 and 2 positions a washer 18 on the lead 20. At the next station to the left, a sleeve 71 forces the washer 18 and the solder ring 69 downwardly in close engagement with the adjacent end of the component member 14. At the last stations shown in FIG. 3, heating elements 72, energized by suitable means 73, cause melting of the solder ring to secure the washer 18 to the adjacent end of the component member 14 and the lead 20.

With the structures of FIGS. 1 and 2 in mind and following the forward and reverse paths represented by the arrow 16, it may be visualized that the component members are fed intermittently in one direction with the leads 19 uppermost to receive washers 17 above solder rings 22, to have these members forced downwardly on the leads 19 to closely engage the end of the component member 14 and to have the washer secured by soldering to the end of the component member by the heating element 66. When the direction of the part is reversed, the position of the component members are reversed locating the leads 20 uppermost, and as they proceed through similar operations, as set forth above, they are provided with solder rings 69 and washers 18. The structure shown in FIGS. 1 and 2 is completely automatic in the accurate location of the leads 19 through operation of the V-grooved jaws 29 in association with the stationary jaws 28, and the operation of the unit 45 with the centering pin 53 to accurately position the washer 17 to receive the upper end of the lead 19 when the pusher 59 moves the component members upwardly to complete location of the washer on the lead. When this action is completed, the unit 45 is moved upwardly freeing the lead 19, with its washer 17, to move laterally with the conveyor to move intermittently from station to station until it is inverted after which the same type of structure is provided to mount the washers 18 on their respective leads 20.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for mounting elements on component member leads comprising:
- a work station,
- means to move components one at a time into said work station,
- means for engaging and positioning a component lead in a work position relative to the work station,
- a shelf having an opening therein mounted in the work station adjacent to said engaging and positioning means for supporting an element in general alignment with the positioned lead,
- means operable to centrally align the element with the lead of the component,
- means operable to cause relative movement of the component and element to position the element on the lead, and
- means for supporting said moving means, engaging and positioning means, aligning means and washer positioning means in cooperative relationship with each other.

2. An apparatus for mounting elements on component member leads according to claim 1 in which:
- the engaging and positioning means comprises spaced, fixed locating jaws disposed in the work station,
- a movable jaw mounted in juxtaposition to said fixed locating jaws and having spaced aligned V-shaped notches therein for receiving the lead, and
- actuating means for moving the movable jaw toward the fixed jaw to cause the V-shaped notches to cooperate with the spaced fixed jaws to locate the lead in the work position.

3. An apparatus for mounting elements on component member leads according to claim 1 in which:
- the means for aligning the element comprises a centering pin with a tapered end which is mounted above said shelf in axial alignment with the lead when it is in the work position, and
- means operable to move the aligning pin through the element which is resting on the shelf in order to move the washer laterally thereon into centrally alignment with the positioned lead.

4. An apparatus for mounting washers on component member leads comprising:
- a frame,
- means defining a work station on said frame,
- conveyor means mounted adjacent to the frame for moving components one at a time into said work station,
- spaced, fixed positioning jaws mounted adjacent to said work station,
- a movable jaw having spaced, V-shaped notches therein mounted opposite the fixed jaws,
- actuating means mounted to said frame for moving the movable jaw toward the fixed jaws to cause the V-shaped notches to cooperate with the fixed jaws to position a component lead in a work position,
- track means mounted in said frame for delivering washers to said work station,
- a shelf having an opening therein mounted to said frame above said movable jaw for supporting a delivered washer in general alignment with the positioned lead,
- means including a centering pin mounted to said frame above said shelf for aligning the washer,
- means operable to move the aligning pin through a washer which is resting on said shelf in order to move the washer laterally thereon into central alignment with the positioned lead, and
- means mounted to said frame operable to cause relative movement of the washer and component to position the washer on the lead.

5. An apparatus for mounting washers on component member leads according to claim 4 in which:
- the means for aligning the washer further includes a pressure unit mounted in the work station concentric with the centering pin and movable in advance of the pin to engage the washer and hold it on the shelf subject to said lateral adjustment in preparation for mounting the washer on the lead.

6. An apparatus for mounting washers on component member leads according to claim 4 further comprising:
- a second work station mounted adjacent said conveyor means, said second work station including means for placing a solder ring on the component lead, and
- a third work station mounted adjacent said conveyor means, said third work station including means to move the washer and solder ring along the lead to a point where they are closely adjacent the component body.

7. An apparatus for mounting washers on component member leads according to claim 6 further comprising:
- a fourth work station mounted adjacent said conveyor, said fourth work station including means for heating the washer to cause the solder ring to melt and thus solder the washer to the lead and component body.

8. An apparatus for mounting washers on axial extending leads from opposing ends of component members comprising:

a conveyor having holding means for components and which is movable intermittently through a forward path and subsequently through a reverse path so that one lead of each component extends upwardly during the forward movement and the other lead of each component member extends upwardly during the reverse movement, a work station disposed adjacent each path where components in their holding means rest between each intermittent movement, means mounted at each work station for engaging leads of the components and positioning them in work positions, shelves with openings therein mounted in the work station above the positioning means to support washers in positions in general alignment with the leads in the mounting positions, means mounted above said shelves at each work station to centrally align the washer with the leads in the receiving positions, and means to cause relative movement of the component members and washers to position the washers on the leads.

9. An apparatus for mounting washers on aligned leads extending from opposing ends of component members according to claim 8 further comprising:

a second work station disposed adjacent each path in advance of said work station, said second work station including means for placing a solder ring on the leads in advance of the work stations, a third work station disposed adjacent each path beyond said work station, said third work station including means for causing movement of the washer and solder ring along the lead of the component to the juncture of the component body and the lead, and a fourth work station having means thereat which are operable for heating the washers to melt the solder rings to connect the washers to the leads adjacent said juncture.

10. An apparatus for mounting washers on leads of component members comprising:

a washer assembly station including a base, means for moving component members one at a time into said washer assembly station, shelf means mounted on said base, means mounted on said base below said shelf for fixedly positioning a component lead therein, chute means mounted on said base for delivering washers one at a time to said shelf, means including a pin mounted on said base above said shelf for axially aligning a washer with said component lead, pusher means mounted below said base operable to insert the component lead through the hole of the aligned washer, and means for successively operating said component positioning means and said washer aligning means.

References Cited by the Examiner

UNITED STATES PATENTS

| | | | |
|---|---|---|---|
| 631,125 | 8/99 | Pflueger | 113—129 |
| 2,309,439 | 1/43 | Burgett | 29—155.55 |
| 2,507,780 | 5/50 | Gilbert | 29—155.55 |
| 2,960,762 | 11/60 | Sindy | 29—203 |
| 3,063,709 | 11/62 | Williams et al. | 29—203 |

WHITMORE A. WILTZ, *Primary Examiner.*